United States Patent [19]

Armstrong et al.

[11] 4,122,671

[45] Oct. 31, 1978

[54] HYDRAZINE DECOMPOSITION AND OTHER REACTIONS

[75] Inventors: Warren E. Armstrong, Lafayette; Donald S. La France, Walnut Creek; Hervey H. Voge, Berkeley, all of Calif.

[73] Assignee: Shell Oil Company, Houston, Tex.

[21] Appl. No.: 234,280

[22] Filed: Oct. 26, 1962

[51] Int. Cl.$^2$ .................................................. C06D 5/04
[52] U.S. Cl. ......................................... 60/218; 60/219; 149/36; 252/472
[58] Field of Search .................. 60/35.4, 218, 219; 149/36

[56] References Cited

U.S. PATENT DOCUMENTS

| 1,907,710 | 5/1933 | Bass | 252/472 |
|---|---|---|---|
| 2,207,868 | 7/1940 | Martin | 252/472 |
| 2,925,709 | 2/1960 | Mantell et al. | 60/218 X |
| 3,081,595 | 3/1963 | Rose | 60/218 X |

*Primary Examiner*—Leland A. Sebastian

[57] ABSTRACT

This invention relates to the catalytic decomposition of hydrazine, catalysts useful for this decomposition and other reactions, and to reactions in hydrogen atmospheres generally using carbon-containing catalysts.

10 Claims, 1 Drawing Figure

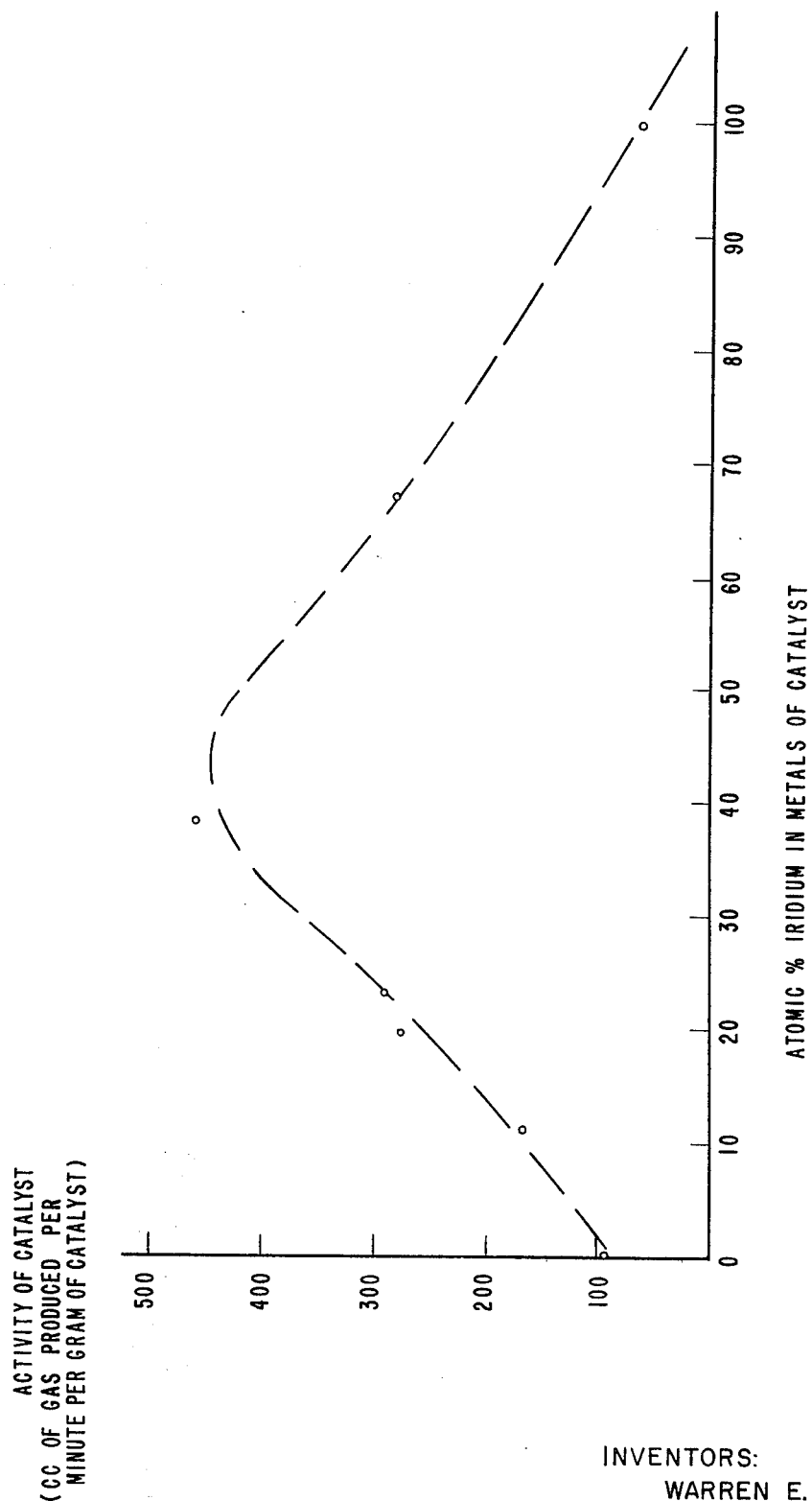

HYDRAZINE DECOMPOSITION AND OTHER REACTIONS

The invention described was made in the performance of work under a NASA contract and is subject to the provisions of the National Aeronautics and Space Act of 1958, Public Law 85-568 (72 Stat. 426; 42 U.S.C. 2451), as amended.

The decomposition of hydrazine for use in gas generators especially for application as a propellant in rockets and like devices has attracted much interest in recent years because of the high specific impulse generated by hydrazine, and its stability and ease of handling. The use of hydrazine as a rocket propellant has been seriously restricted, however, because the catalysts heretofore used to promote its decomposition were effective only at high temperatures. As a result, it was necessary to supply an oxidant to bring the catalyst to decomposition temperature. This required auxiliary equipment for the supply and metering of the oxidant. It not only added undesirable weight to the gas generating unit but also undesirably complicated the required apparatus and increased the opportunities for malfunctioning of equipment. A special feature of the present invention is the provision of catalysts for the decomposition of liquid hydrazine that are sufficiently active to be self-starting at temperatures as low as 0° C. These catalysts make it feasible to use liquid hydrazine as a mono-propellant without need for any oxidant for heating the gas generator. A much simpler gas generator is thus provided.

In accordance with the invention self-starting decomposition of liquid hydrazine is accomplished with a catalytic mixture of certain special metals, namely mixtures of iridium and ruthenium or of iridium or ruthenium or both with platinum on a porous support. Platinum group metals with or without supports have been suggested as catalysts for hydrazine decomposition in French Pat. No. 1,249,853, where in Table 2 the use of a catalyst containing 0.4% wt platinum and 0.1% wt rhodium on an alumina support is shown. The results given for this catalyst are inferior to those shown for catalysts made with a number of individual platinum group metals. It was therefore surprising to find that mixtures of ruthenium with at least one metal of the group consisting of iridium and platinum when used in the proper proportions on a porous support having a surface area of at least 3 square meters will catalyze the decomposition of liquid hydrazine at much higher rates than can be obtained with any of the previously described hydrazine-decomposition catalysts. These improved results are obtained with the mixtures in which the ruthenium is about 30 to 90 atom percent of the total catalyst metals present. With catalysts having this special range of proportions, the activity for liquid hydrazine decomposition is greater than that of their components used individually or in other proportions.

Especially outstanding results have been obtained with the foregoing mixtures which contain about 30 to about 80 percent of ruthenium with about 70 to about 20 atom percent iridium. Those having iridium and ruthenium in these proportions are novel catalytic mixtures which are a special feature of the invention. From the attached drawing showing the way in which these catalyst mixtures vary in activity with iridium content, the importance of using mixtures in which the iridium is in the 20 to 70 atom percent range can be seen. The results shown were obtained in the decomposition of hydrazine at 1° C. using iridium-ruthenium catalysts on Barneby-Cheny KH-1 carbon of 20 to 42 mesh in which the total weight of catalyst metal was 6.9 to 8.5%. The special advantage in using support materials having the previously indicated minimum surface area and which are sufficiently stable under the operating conditions to provide catalysts having the required effective life is also shown. Suitable supports include alumina, particularly activated alumina, diatomaceous earths, kieselguhr and like siliceous materials, silica gels, silica-alumina gels, and the like, porous clays, particularly those of the bentonite type, titanium dioxide, calcium carbonate, barium sulfate, and the like when prepared in the known way to provide the required surface area. The supports of this type which are stable under hydrazine decomposition conditions are especially useful. This is particularly the case with certain aluminas which combine desirable thermal stability with good activity of the combined iridium-ruthenium or ruthenium-platinum metals used therewith. These aluminas are characterized by moderate surface area, preferably in the range 3–200 square meters per gram. Such aluminas may be prepared by sintering or bonding fine powders obtained by grinding fused alumina of alpha or corundum structure. They may also be prepared by controlled calcination of precipitated aluminum oxides or hydrated oxides. Especially suitable carriers are, for example, "Alundums" of 6–70 $m^2/g$ surface area such as are made by the Norton Co. of Worchester, Mass.

Higher activity in hydrazine decomposition is obtained however by using a porous carbon support for the catalyst metals. At the high temperatures encountered in this decomposition, it has been found that the effective life of these carbon-containing catalysts is limited due to loss of carbon from the catalyst. This has been found to be the case in other reactions carried out at elevated temperatures in the presence of hydrogen but in the substantial absence of methane. An important object of the invention in one of its various modifications is the provision of an advantageous method for avoiding this catalyst loss. As a result of the successful solution of this problem, by the novel method of operation described hereinafter, the use of high activity catalysts containing iridium and ruthenium or ruthenium and platinum on porous carbon for hydrazine decomposition becomes practical. Also the effective life of carbon-containing catalysts in general can be increased in the same way in other reactions, particularly other decomposition reactions in which hydrogen is present in the absence of methane.

As porous carbon supports for the iridium and ruthenium or iridium or ruthenium and platinum catalysts for hydrazine decomposition, the forms of carbon which have an average surface area of at least 50 square meters per gram are especially suitable, and most preferably those with surface areas in the range of about 50 to about 1500 square meters per gram are used. Porous granular carbons such as vegetable or animal charcoals are especially useful, but porous carbon from other sources, for example, pyrolytic carbon or lamps blacks or the like can also be used. The numerous activated carbons which have been treated to increase their adsorptive capacity are particularly advantageous components of the catalysts. These include, for example, wood charcoals, coconut charcoal, etc., activated by steaming at high temperature, and the like.

The porous support used preferably has a particle size between about 2 and about 20 mesh. Pelleted or other shaped forms of support material can be used as well as porous powders. Convenient pellet sizes range from 1/16 inch to ½ inch.

The catalysts can be prepared in various ways. One suitable method comprises impregnating the chosen porous support with a solution of salts of the combination of ruthenium, iridium and platinum metals which are to be present in the final catalyst. The impregnation can be carried out by adding to the porous support enough solution to fill the pores, then drying and calcining. Better results are usually obtained, however, by soaking the porous particles in an excess of solution from which the required amount of the salt mixture is adsorbed by the support after which the porous support is dried and then calcined as before. It is advantageous to evacuate the support before adding the solution as faster and more complete impregnation can then be obtained. Solutions of the mixture of platinum group metal salts may be made up in water, alcohol, or other suitable solvents.

Any soluble salts of iridium or ruthenium or platinum can be employed in making the catalysts. Those which can be decomposed to the metal by heating at a temperature below about 1000° C. are preferred. Chlorides, nitrates and the like are examples of suitable salts. The acid chlorides obtained by dissolving the neutral chlorides in hydrochloric acid solution have been found to give more active catalysts than the corresponding neutral chlorides. It is not necessary that the mixture of salts of the metals used all have the same anions. Iridium chloride can be used with platinum nitrate or ruthenium nitrate with platinum chloride, for example. As a rule, solutions of the chosen mixture of salts which contain about 0.001 to about 0.1 grams of total platinum group metal per milliliter are advantageous especially when containing the corresponding acid in a concentration of about 0.4 to about 3 normal. Thus especially active hydrazine decomposition catalysts have been obtained by impregnating porous support material of the required surface area with solutions containing chlorides of the chosen metals in amounts corresponding to about 0.01 to 0.04 grams total of these metals per milliliter in aqueous hydrogen chloride of about 0.8 to about 1.2 normality.

Still other methods of catalyst preparation can be employed. But whatever method is used, one generally obtains catalysts of most useful activity by depositing about 0.1 to about 35% wt of total active catalyst metal on the porous support.

It has also been found that the activity of the hydrazine decomposition catalysts of the foregoing types is further enhanced if the impregnation of the porous carbon with the mixture of iridium or ruthenium and other platinum group metal is carried out in the presence of an ammonium salt soluble in the mixture. Advantageously an ammonium salt corresponding to the anion of one of the platinum group metals used is employed. The ammonium salt can conveniently be formed in situ in the impregnating solution by adding ammonium hydroxide or chloride or the like to the acid solution of mixed platinum group salts. Usually about 0.1 to about 10 moles, more preferably about 1 to about 4 moles, of ammonium salt per mole of total platinum group metal salts present is employed. For example, with catalysts composed essentially of 5.1% Ru and 2.9% Ir on porous carbon, the hydrazine decomposition rate was increased from 175 milliliters per minute per gram of catalyst to 330 milliliters per minute per gram of catalyst when ammonium hydroxide was added to the solution of $H_2IrCl_6$ in 1 normal hydrogen chloride used for the impregnation of the carbon.

The porous support containing the solution of mixed platinum group metal salts is dried by heating in air or in a stream of other suitable gas. Drying temperatures of about 90° to about 200° C. are suitable. The impregnation and drying can be repeated one or more times when it is desirable to use larger amounts of platinum group metals in the catalyst.

The dried impregnated support is then heated, preferably in a stream of hydrogen or inert gas to decompose the platinum group metal salts present therein. Calcining at about 400° to about 1000° C. for about one-fourth to about 5 hours is usually adequate.

The catalysts can be used for hydrazine decomposition in any suitable way. A bed of catalyst particles into which the liquid hydrazine is fed is one suitable form of decomposition apparatus. Other methods of effecting the required contact between the hydrazine and the catalyst can also be used. While it is a feature of the invention that successful decomposition can be effected with the catalyst and hydrazine at initial low temperatures, limited only by temperatures so low that hydrazine freezes on contact, this is not essential to the new process which also offers advantage where initial operation at elevated temperatures is desirable. Decomposition at ordinary or lower pressures is preferred but superatmospheric pressures can be employed although pressures above about 100 atmospheres are generally less advantageous.

The new catalysts can be used alone but there are special advantages in using them in combination with less active catalysts for hydrazine decomposition. A particularly advantageous catalyst combination of this kind comprises a bed containing a layer of hydrazine decomposition catalyst of conventional activity to which is added at the feed end of the bed a portion of the more active self-starting hydrazine decomposition catalyst. As the self-starting hydrazine decomposition catalyst there is preferably used the mixed metal catalyst containing iridium and/or ruthenium on a porous support according to the present invention but any other catalyst of suitable activity can be used. The less active catalyst which makes up the later part of the bed, can be, for example, granular particles of reduced iron oxide, or cobalt, nickel, copper or other transition metals on low area, inert supports.

The relative proportions of the two kinds of catalysts in the decomposition bed will depend upon their activities. As a general rule the preferred composite catalysts, containing iridium and/or ruthenium on a porous support at the feed end of the bed, will make up about 20 to about 80 percent of the total catalyst in the bed with the remainder being the less active hydrazine decomposition catalyst which can be a single catalyst or mixture thereof. The particle size of both portions of catalyst are preferably about one-eighth to one-fourth inch in diameter.

With these composite catalysts not only is the total cost of catalyst reduced due to the lesser amount of more expensive, more active catalyst required, but also better control of hydrazine decomposition can be obtained therewith than with catalyst beds of a single catalyst or a uniform catalyst mixture. Thus, the decomposition of liquid hydrazine takes place by two reactions:

$$H_2N\text{-}NH_2 \rightarrow \tfrac{1}{3} N_2 + 4/3\, NH_3 + 26.7 \text{ kcal} \tag{1}$$

$$H_2N-NH_2 \rightarrow N_2 + 2H_2 + 12 \text{ kcal} \qquad (2)$$

For rocket motor use it is desirable to produce the maximum number of moles of gas at the highest temperature. Decomposition by the more highly exothermic reaction of equation (1) favors high temperature while the decomposition of equation (2) gives substantially more molecules of gas per mole of hydrazine. By the use of the composite catalysts of the invention the decomposition of hydrazine can be controlled so as to achieve the optimum balance between these modes of decomposition and thereby attain most efficient power output.

Typical of the results which can be obtained by the new method are the following which are intended to be illustrative only and not restrictive of the invention.

EXAMPLE I

A catalyst containing 4.3% wt iridium and 3.7% wt ruthenium on activated carbon was prepared using Barneby-Cheney KH-1 carbon (20–42 mesh) which had previously been washed with hot 1.0 normal hydrochloric acid and water, and dried. Three grams of the carbon was added to an aqueous solution prepared as follows: 3.67 cc of a solution containing 0.0234g iridium per cc and 1 normal in HCl made from $H_2IrCl_6$, HCl and water was combined with 1.85 cc of a solution containing 0.040g ruthenium per cc made from $RuCl_3 \cdot 3H_2O$ and water. This combination was diluted with 5 cc of water. The above mixture was contained in a 50 ml pyrex beaker and evaporated with stirring by a glass rod on a hot plate and further dried at 140° C. in an oven. The dry catalyst was calcined in a tube under a flow of hydrogen at 550° C. for one-half hour and then cooled to room temperature in nitrogen. The final weight of catalyst was 2.014 grams. For comparison a series of other catalysts were prepared in the same general way but with different volumes of reagents so as to obtain catalysts with different amounts and/or proportions of iridium and ruthenium on the carbon as shown in the following table where the activity of the catalyts as measured by the cubic centimeters of gas produced per minute per gram of catalyst in the decomposition of liquid hydrazine is also given:

| W % Ru | W % Ir | Total W % Metals | At % Ir In Metals | Atomic Ratio Ru/Ir | Activity at 1° C cc of gas/min g cat |
|---|---|---|---|---|---|
| 8.5 | 0 | 8.5 | 0 | ∞ | 95 |
| 5[a] | 0 | 5 | 0 | ∞ | 28 |
| 6.3 | 1.5 | 7.8 | 11.1 | 8.0 | 165 |
| 5.1 | 2.9 | 8.0 | 23 | 3.3 | 290 |
| 6.3 | 2.9 | 9.2 | 19.5 | 4.1 | 276 |
| 3.7 | 4.3 | 8.0 | 38 | 1.6 | 460 |
| 1.5 | 6.3 | 7.8 | 66.6 | 0.5 | 285 |
| 3.7 | 6.4 | 11.1 | 47.5 | 1.1 | 455 |
| 3.3 | 7.8 | 11.1 | 55.5 | 0.8 | 672 |
| 10.0 | 5.8 | 15.8 | 23 | 3.3 | 650–1000 |
| 13.9 | 14.1 | 28 | 34.5 | 1.9 | About 2000 |
| 0 | 6.9 | 6.9 | 100 | 0 | 63 |
| 0 | 18.0 | 18 | | 0 | 145 |
| 1.4 | 12.0 | 13.4 | 83.4 | 0.2 | 545 |
| 1.3 | 0.8 | 2.1 | 38 | 3.1 | 57 |
| 2.4 | 1.9 | 4.3 | 44 | 2.4 | 82 |

[a] Columbia C-5 carbon from National Carbon Co.

EXAMPLE II

Liquid hydrazine was decomposed with another series of catalysts containing ruthenium together with platinum on activated carbon. The catalysts were made by the method described in Example I. The tests were carried out with 0.1 grams or less of 20-30 mesh or finer catalyst at atmospheric pressure using 2 to 3 cc of liquid hydrazine.

| Catalyst | | | | | | |
|---|---|---|---|---|---|---|
| Ruthenium (Wt. %) | Platinum (Wt. %) | Total Wt. % Metal | Atomic % Ruthenium In Metals | Atomic Ratio Ruthenium to Other Platinum Metals | Porous Carbon | Activity at 1° C cc of gas/min gram catalyst |
| 2.0 | 2.0 | 4 | 66 | 2. | Barneby-Cheney KH-1 | 69 |
| 5.1 | 3.7 | 8.8 | 72 | 2.6 | Barneby-Cheney KC-3 Pellets | 245 |
| 9.2 | 6.8 | 16 | 72 | 2.6 | " | 540 |
| 6.8 | 1.0* | 8.9 | 86.5 | 6.4 | Barneby-Cheney KH-1 | 278 |

*1.1% iridium also present

EXAMPLE III

The advantage of carrying out the impregnation of the porous carbon in the presence of an ammonium salt is shown by the following results obtained with a series of catalysts made as described in Example I except that different amounts of ammonia were added with the $IrCl_4$ solution in all cases except the control. The catalysts were made by impregnating 3.0 grams of acid treated active porous carbon with 4.0 ml ruthenium trichloride containing 0.04 grams of ruthenium per milliliter, 4 ml of iridium tetrachloride in 1 normal hydrogen chloride containing 0.023 grams of iridium per milliliter, and sufficient water to make a total of 10 milliliters of solution. The final catalysts contained 7.75% total iridium and ruthenium and had an atomic ratio of ruthenium to iridium of 3.2. The activities of the catalyst in decomposition of hydrazine at 1° C. were as follows:

| Milliliters of $NH_4OH$ added to the $IrCl_4$ Solution | Cubic Centimeters of gas produced per minute per gram of catalyst |
|---|---|
| None | 175 |
| 0.1 | 188 |
| 0.5 | 215 |
| 1.0 | 330 |
| 3.0* | 255 |

*Catalyst acidified after drying and before calcining

EXAMPLE IV

A series of catalysts was made as described in Example I using various alumina or alumina-silica supports of different surface areas. In each case the catalyst contained a total of 15% wt of total catalyst metal of which 34.5 atom precent was iridium metal and the remainder ruthenium metal, so the atomic ratio of ruthenium to other metal was 1.9. The catalysts were tested for activity in hydrazine decomposition in the way described in Example I with the following results:

| Manufacturer and Grade | Composition Support | Surface Area of Support (sq. meters per gram) | Activity at 1° C cc of gas/min gram catalyst |
|---|---|---|---|
| A.I.A.G. Co. R-13K | pure α-$Al_2O_3$ | 3.9 | 43 |
| Girdler T-708 | α $Al_2O_3$ | 7–8 | 71 |
| Norton Co. LA-623 | $Al_2O_3$-19% $SiO_2$ | 9–15 | 76 |
| Norton Co. LA-622 | $Al_2O_3$-19% $SiO_2$ | 30–40 | 205 |
| Harshaw Al 0501 | $Al_2O_3$ | 40 | 185 |
| Norton Co. LA-617 | $Al_2O_3$-19% $SiO_2$ | 60–70 | 104 |
| Harshaw Al 0501 | $Al_2O_3$ | 81 | 87 |
| A.I.A.G. Co. RAP | pure eta-$Al_2O_3$ | 169 | 179 |
| ALCOA H-40 | $Al_2O_3$ | about 300 | 89 |

Under the same conditions a catalyst made in the same way using active carbon having a surface area of about 1000 sq. meters per gram had an activity of 850 cc gas per minute per gram of catalyst.

EXAMPLE V

A catalyst was prepared as in Example I using 15% wt of iridium and ruthenium (34.5 atom percent iridium) on a boron nitride support having a surface area of 17 square meters per gram. When tested as in the foregoing Examples, this catalyst had an activity for hydrazine decomposition of 187 cc gas per minute per gram of catalyst.

Similar good results are obtained when a kieselguhr support of about the same surface area is substituted for the boron nitride in this catalyst.

EXAMPLE VI

A catalyst made as described in Example I and containing 16% wt of ruthenium and iridium in a ratio of 3.2 atoms of ruthenium per atom of iridium on active carbon which had been acid washed, and crushed to less than 20 mesh showed an activity corresponding to a gas formation rate at 1° C. of 663 cc per minute per gram of catalyst in the hydrazine decomposition test described in Example II. The same catalyst prepared with 5/32 inch pellets of the same carbon was tested in a fifty-pound thrust rocket motor. Self-starting was good at the prevailing temperature of about 18° C. and pressure drop characteristics were excellent during two sixty-second firings. Sufficient loss of catalyst was observed in these tests to cause significant shortening of its effective life.

The loss of catalyst was traced to formation of methane from the carbon used in making the catalyst. As previously pointed out the decomposition of hydrazine takes place in two ways, one giving hydrogen as a major product. At the high temperatures generated by the exothermic reactions, the hydrogen reacts with the carbon of the catalyst forming methane. As the carbon is removed the amount of effective catalyst metal decreases and successful operations may ultimately be prevented. As previously indicated, it has been discovered that this limitation on the life of the catalyst can be overcome or at least substantially reduced. This is achieved in accordance with the invention by introducing into the decomposing mixture sufficient methane to reduce the formation of methane from the carbon of the catalyst.

The required methane can be introduced in any suitable manner, either by adding methane itself or a methane-generating compound to the hydrazine feed to the unit. Suitable methane-generating compounds are preferably liquids or solids soluble in the hydrazine. These include, hydrocarbons, such for instance, as acetylene, methyl acetylenes, benzene, methyl benzenes; methyl amines, as mono-, di and/or tri-methyl amine and like methane-forming amines; also alkyl hydrazines, such as monomethyl hydrazine, unsymmetrical dimethyl hydrazine, and the like. These are special advantages in using a methyl-substituted hydrazine for protecting carbon-containing hydrazine decomposition catalysts. Mono- and/or dimethyl hydrazines are particularly suitable.

The amount of methane or of methane-generating compound which it will be necessary to add to the hydrazine feed will depend on the temperature and pressure at which the decomposition of the hydrazine is carried out. The minimum desirable amount of methane can be calculated from the equation $$A = 1.8 \times 10^{-8} B^2 P (2.71828)^{21,580/RT}$$

where
$A$ is the mole % $CH_4$ or equivalent in the product gases
$B$ is the mole % hydrogen generated in the reaction product gases
$P$ is the pressure in atmospheres absolute
$R$ is 1.986 calories per degree moles
$T$ is the temperature in °K.

According to this equation the minimum amount of methane is increased if the hydrogen content or the pressure is raised or if the temperature is lowered. It is usually desirable to use an excess of about 2 to about 100%, more preferably about 10% to about 50% above this minimum amount. With added methane-generating compounds in these amounts the loss of carbon from hydrazine decomposition catalysts can be practically eliminated and the effective life of the catalyst correspondingly extended.

EXAMPLE VII

The beneficial effect of methane in protecting hydrazine decomposition catalysts was demonstrated by a series of reactor-motor firing tests carries out in a small unit having a reactor 47 mm long by 8.2 mm inside diameter. All parts of the reactor in contact with the propellant were constructed of stainless steel and cooling jackets were provided for temperature control. The catalyst was of 20–30 mesh and containing 8% wt of ruthenium plus iridium (atomic ratio 2.5:1) on porous carbon. The methane was introduced by decomposition of methyl hydrazines added to the hydrazine feed in various amounts. In all cases firing was good at the ambient temperatures used.

| Methane Source | Amount in The Hydrazine | Amount of Catalyst (grams) | No of Firings (5 ml of feed each) | Weight Loss of Catalyst |
|---|---|---|---|---|
| None | None | 0.795 | 10 | 55.3% |
| Unsymmetrical dimethyl hydrazine | 10% | 0.979 | 10 | None |
| " | 10% | 0.85 | 20 | 7.9% |
| " | 5.5% | 0.875 | 10 | 5% |
| Monomethyl Hydrazine | 11.5% | 0.589* | 10 | 4.8% |

*7.8% wt ruthenium plus iridium on carbon with atomic ratio ruthenium to iridium 1.6:1 as catalyst in mid-half of reactor with remainder packed with inert 14–28 mesh Alundum There are a great many other processes in which the addition of methane or methane-generating compounds with the feed is advantageous in reducing the loss of catalysts containing carbon in combination with an active metal such, for instance, as iron, cobalt, nickel, copper, silver and the like as well as the previously mentioned platinum group metals. The method is generally useful whenever these catalysts are employed at temperatures of about 500° to 1500° C. and pressures up to about 100 atmospheres or more in reactions in the presence of hydrogen but in the substantial absence of methane. At temperatures substantially below 500° C. the rate of conversion of the carbon to methane becomes slow, and no protective feed additive is needed. Some typical examples of such reactions in which the invention is especially useful are hydrogen treatment of organic or inorganic compounds using nickel on active carbon or like catalysts, for instance hydrogen treatment of aromatic hydrocarbons, synthesis of ammonia from hydrogen and nitrogen, hydrogenation of carbon monoxide to methanol, etc. These processes are made more economical by using carbon-supported catalysts and adding to the feed methane or compounds such as CO, $CO_2$, methanol, diazomethane, toluene, xylene and the like which will generate methane under the operating conditions.

EXAMPLE VIII

Hydrogen treatment of benzene using a 10:1 mole ratio of $H_2$ to benzene, and a nickel on Columbia carbon hydrogenation catalyst of about 20 to 30 mesh at about 525° C. and atmospheric pressure results in loss of catalyst through methanation of the carbon of the catalyst. Dilution of the hydrogen of the feed with methane in an amount sufficient to provide about 50 mole percent methane in feed substantially reduces this loss.

EXAMPLE IX

In the synthesis of ammonia using iron plus promoters on porous carbon as catalyst a hydrogen to nitrogen mole ratio of 3 to 1 and a temperature of about 500° C. at 100 atmospheres pressure, the loss of carbon from the catalyst can be as high as 20% per hour. By adding 90% of methane with the feed this loss is greatly reduced.

Dehydrogenation of hydrocarbons is another type of reaction in which the life of metal-on-carbon catalysts can be materially extended by adding methane or a methane-generating compound with the feed.

EXAMPLE X

Reforming of petroleum fractions to effect dehydrogenation of the paraffin and naphthene content to olefins using a chromia on carbon catalyst at about 550° C. and 2 atmospheres pressure involves significant loss of catalyst through methanation of the carbon in the catalyst by the hydrogen formed in the reaction to the extent of about 50 mole % of the reaction products. Addition of 25% methane or equivalent methane-forming material with the feed substantially reduces this loss.

EXAMPLE XI

In the production of butadiene by dehydrogenating butylene at 620° C. and atmospheric pressure, with 10 moles of steam added per mole of butylene, the loss of catalyst through methanation of the active carbon therein can be substantially reduced by adding to the hydrocarbon feed about 0.3 mole % of methane.

EXAMPLE XII

Dehydrocyclization of a $C_6$ to $C_9$ fraction of paraffins is effected at 525° C. over a platinum on carbon catalyst under 2 atmospheres pressure. A gaseous feed mixture containing 50% hydrogen, 30% methane, and 20% $C_6$–$C_9$ hydrocarbons is used to insure long catalyst life.

EXAMPLE XIII

Production of aromatic hydrocarbons from naphthenes boiling from about 70 to about 200° C. by dehydrogenation with a carbon-based, metal-containing catalyst is effected under the conditions of Example X. Inclusion of sufficient methane to give about 30% methane in the hot product gas avoids catalyst loss.

It will thus be seen that the invention is widely applicable and offers advantage in all types of reactions carried out at elevated temperatures in the presence of hydrogen when using metal catalysts on porous carbon supports where substantial amounts of methane sufficient to inhibit methanation of the carbon support is not present under normal reaction conditions.

We claim as our invention:

1. A method for the self-starting decomposition of liquid hydrazine which comprises contacting the hydrazine with a catalyst consisting essentially of a porous support having a surface area of at least about 3 square meters per gram and about 0.1 to about 35% by weight of a mixture of ruthenium with at least one metal of the group consisting of iridium and platinum in which the ruthenium is about 20 to about 70 atom percent of said metals.

2. A method in accordance with claim 1 wherein the metals are ruthenium and iridium.

3. A method in accordance with claim 2 wherein the iridium is about 25 to about 65 atom percent of the ruthenium and iridium present.

4. A method in accordance with claim 1 wherein the metals are ruthenium and platinum.

5. In the decomposition of hydrazine by contact with a metal catalyst on a carbon support wherein loss of catalyst takes place, the method of reducing catalyst loss by introducing with the hydrazine feed a minor amount of methylhydrazine sufficient to liberate in the decomposition mixture a quantity of methane which will reduce formation of methane from the carbon support for the catalyst.

6. A process in accordance with claim 5 wherein the catalyst contains a mixture of at least two platinum group metals.

7. A process in accordance with claim 6 wherein the catalysts metal is predominantly ruthenium together with at least one member of the group consisting of platinum and iridium.

8. In reactions at temperatures of about 500° to 1500° C. in the presence of hydrogen and a catalyst containing carbon and a catalytic metal but in the substantial absence of methane wherein loss of said catalyst takes place, the method of reducing the loss of said catalyst by introducing into the reacting mixture in contact with the catalyst sufficient methane or methane-generating material to reduce formation of methane from the carbon of said catalyst under the reaction conditions.

9. A process in accordance with claim 8 wherein dehydrogenation is carried out by contacting a hydrocarbon with a metal dehydrogenation catalyst on a carbon support at a temperature of about 450 to about 1000° C. and a hydrogen partial pressure of at least 0.1 psig.

10. A process in accordance with claim 8 wherein a pyrolysis in which hydrogen is produced is carried out.

* * * * *